(12) United States Patent
Baughman (10) Patent No.: US 7,948,439 B2
(45) Date of Patent: May 24, 2011

(54) TRACKING OF AUTONOMOUS SYSTEMS

(75) Inventor: David C. Baughman, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 396 days.

(21) Appl. No.: 12/143,055

(22) Filed: Jun. 20, 2008

(65) Prior Publication Data

US 2009/0315777 A1 Dec. 24, 2009

(51) Int. Cl.
*G01S 3/02* (2006.01)
(52) U.S. Cl. .................................................... 342/463
(58) Field of Classification Search .......... 342/457–458, 342/450, 463–465
See application file for complete search history.

(56) References Cited

U.S. PATENT DOCUMENTS

| | | | |
|---|---|---|---|
| 4,884,208 A | 11/1989 | Marinelli et al. | |
| 5,974,329 A * | 10/1999 | Wylie et al. | 342/457 |
| 6,990,406 B2 | 1/2006 | Fink | |
| 2004/0006424 A1 | 1/2004 | Joyce | |
| 2005/0104736 A1 | 5/2005 | Gudat | |
| 2006/0061469 A1 | 3/2006 | Jaeger et al. | |
| 2006/0229801 A1 | 10/2006 | Fink | |

FOREIGN PATENT DOCUMENTS

| | | |
|---|---|---|
| WO | 9919742 | 4/1999 |
| WO | 0115469 | 3/2001 |
| WO | 0214894 | 2/2002 |

OTHER PUBLICATIONS

UK Intellectual Property Office, "International Search Report", Jul. 30, 2009, Published in: GB.

* cited by examiner

*Primary Examiner* — Thomas H Tarcza
*Assistant Examiner* — Fred H Mull
(74) *Attorney, Agent, or Firm* — Fogg & Powers LLC (57) ABSTRACT

A system includes first and second transmitters attachable to first and second vehicles. The transmitters can each transmit successive signals at predetermined time intervals. Tracking stations at different locations are configured to receive the signals transmitted by at least one of the first and second transmitters, distinguish signals transmitted by the first transmitter from signals transmitted by the second transmitter, and determine from the transmitted signals respective position information for at least one of the first and second transmitters. Each of the tracking stations is further configured to be in signal communication with at least one other of the tracking stations. The system further includes at least one processing device in signal communication with at least one of the tracking stations. The processing device is configured to determine from the position information a location of the first vehicle relative to a location of the second vehicle.

18 Claims, 6 Drawing Sheets

TRACKING OF AUTONOMOUS SYSTEMS

GOVERNMENT INTEREST

This invention was made with United States Government support, funded by the U.S. Army Contracting Agency under Government Contract No. W9124Q-07-C-0687. The Government has certain rights in the invention.

BACKGROUND OF THE INVENTION

Many future concepts rely on small autonomous systems, working together in groups or swarms. The small size and potentially large numbers of such systems that might be demonstrated together, poses a severe challenge to existing range tracking systems to provide time-and-space-position information (TSPI) for individual systems under test. The emphasis on increasing the level of autonomy for these systems further exacerbates the problem, by removing humans from the control loop. Because of their autonomous behaviors, it is even more important to maintain accurate TSPI for each platform involved. The TSPI is necessary to support range safety, platform recovery operations and to provide useful information to the test sponsor on the relationship between individual platforms to aggregate group behavior.

Existing range radar and optical tracking systems are not equipped to provide TSPI in the Physical/Battlespace domain for large numbers of small objects, particularly in instances where a combination of air, ground, sea and/or subsurface vehicles are used in concert. Such scenarios are being studied for use in a number of future applications. Examples include urban assault, port security and homeland defense missions, where unmanned systems operate together to not only collect information, but to accomplish complex tasks without human intervention, such as breaching structures and neutralizing threats. The use of collaborative unmanned vehicles allows task specialization between platforms, as well as autonomous re-tasking of assets, to overcome loss or failure of others in the group. No test range currently exists that can unobtrusively monitor the actions of large groups of diverse autonomous systems. TSPI is required not only in support of range safety, but also provide information to test sponsors, allowing evaluation of group behavior. The potential for large numbers of small, specialized autonomous systems, combined with the unscripted, autonomous behavior, creates a difficult problem for existing range sensors to maintain TSPI for individual platforms within the group. Traditional methods of tracking small objects rely on the use of signature enhancers, optical or RF, that increase the object's signature, allowing it to be tracked by existing range instrumentation radars or optical trackers. However, these systems are relatively large and can require significant power to operate.

For small autonomous systems, applying traditional translators or beacons may not be practical due to platform constraints on the payload size, weight, power consumption and/or impacts to the platform's dynamic properties. Furthermore, as the number of platforms involved in the test increases, any concept that requires instrumentation of individual platforms must ensure that the instrumentation can be accomplished rapidly, without the need for complex integration or calibration.

The nature of autonomous systems and the wide variety of potential missions that can be explored drive the need to perform testing under a very wide array of terrain, vegetation and topologies. Instrumenting a permanent facility would not allow the user the flexibility needed to adequately test unmanned autonomous systems (UAS) or other systems under all desired conditions.

SUMMARY OF THE INVENTION

In an embodiment, a system includes first and second transmitters attachable to first and second vehicles. The transmitters can each transmit successive signals at predetermined time intervals. Tracking stations at different locations are configured to receive the signals transmitted by at least one of the first and second transmitters, distinguish signals transmitted by the first transmitter from signals transmitted by the second transmitter, and determine from the transmitted signals respective position information for at least one of the first and second transmitters. Each of the tracking stations is further configured to be in signal communication with at least one other of the tracking stations. The system further includes at least one processing device in signal communication with at least one of the tracking stations. The processing device is configured to determine from the position information a location of the first vehicle relative to a location of the second vehicle.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
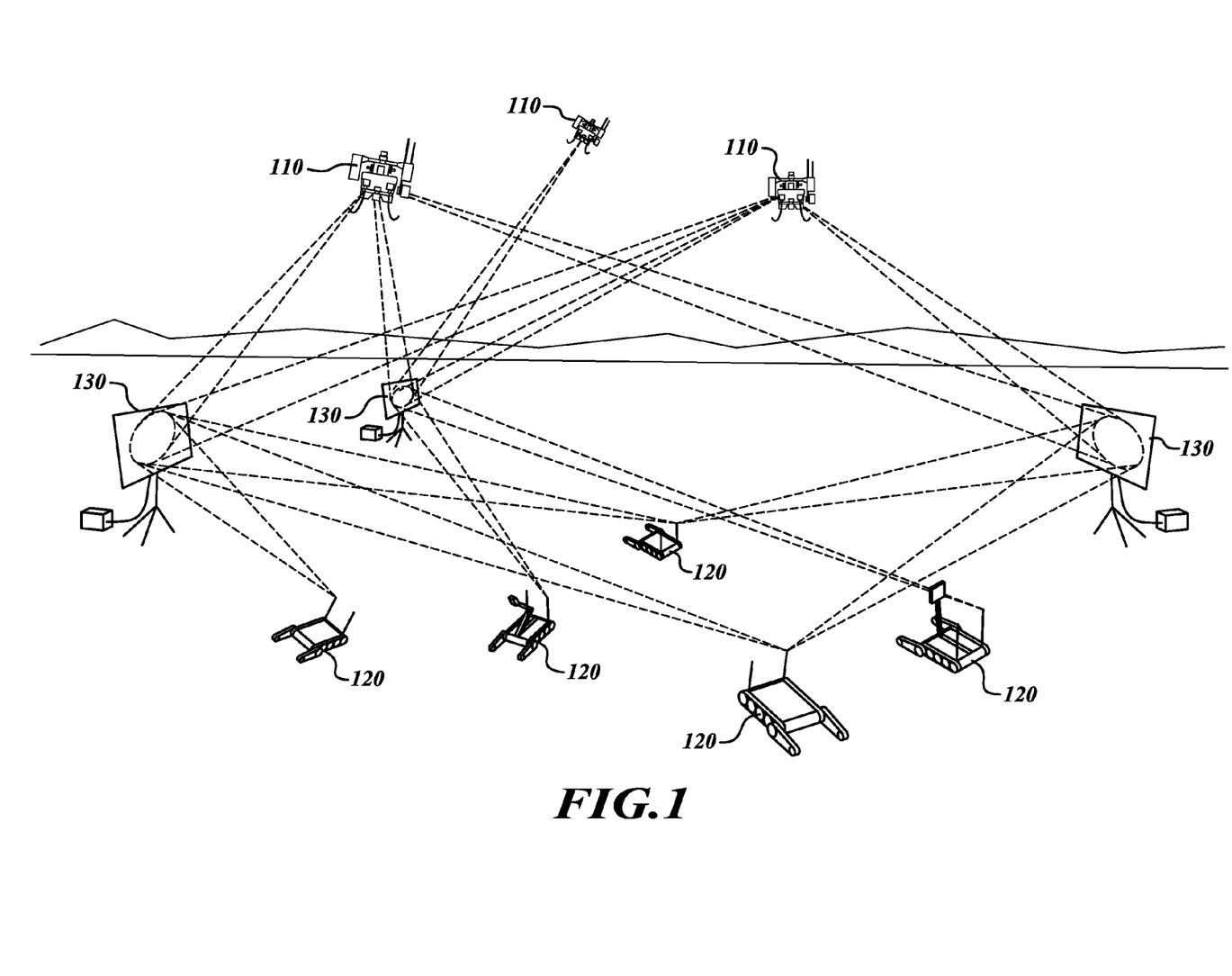
FIG. 1 is a schematic illustration of a system for tracking multiple vehicles according to an embodiment of the invention.

Referring to FIG. 1, an embodiment provides the ability to individually track numerous, small autonomous systems, including manned or unmanned aerial vehicles 110 and/or terrestrial-based ground/sea-surface vehicles 120, in varying terrain and conditions, without impacting the performance of the autonomous systems. Such vehicles 110, 120 may be autonomous in that there is no active navigational control by human users during vehicle operation. A system according to an embodiment is portable and can be used in any terrain, requiring only minimal test preparation and little support equipment. The system according to an embodiment includes a set of small micro-beacons (not shown in FIG. 1), which may employ RF communication, one of each of which are attached to a respective aerial vehicle 110 and/or surface vehicle 120. The system further includes a set of stationary ground tracking stations 130, each of which receive and identify beacon signals transmitted by the micro-beacons. By combining several ground tracking stations 130, beacon relative positions can be computed through a locator method, such as triangulation or multilateration by at least one processing device (not shown in FIG. 1) coupled to or otherwise associated with one or more of the tracking stations 130. Each of the tracking stations 130 is configured to communicate with at least one other of the tracking stations via a wireless or wired approach. In an embodiment, N tracking stations 130 can track N+1 or more beacon-bearing vehicles 110, 120. In an embodiment, at least two ground stations may be used to track N vehicles in two dimension, and at least three ground stations may be used to track N vehicles in three dimensions, where N is any number between 1 and the maximum number (e.g., 257 correlators for a 255-bit Gold code).

The micro-beacons are simple, small, self contained micro-beacons that can be adhesively attached to each vehicle 110, 120, without requiring any data or power interface with the host vehicle 110, 120. In order to compute and maintain position information for each micro-beacon, the ground tracking station 130 can perform at least three functions: (1) capture micro-beacon 200 signals, (2) separate and identify individual beacon signals, and (3) determine the bearing angle relative to the transmitting beacon. Measured lines of bearing from each ground tracking station 130 can be combined in a processing device to perform triangulation or multilateration to estimate the positions of the beacon carrying vehicle 120 or 130.

Figure 2:
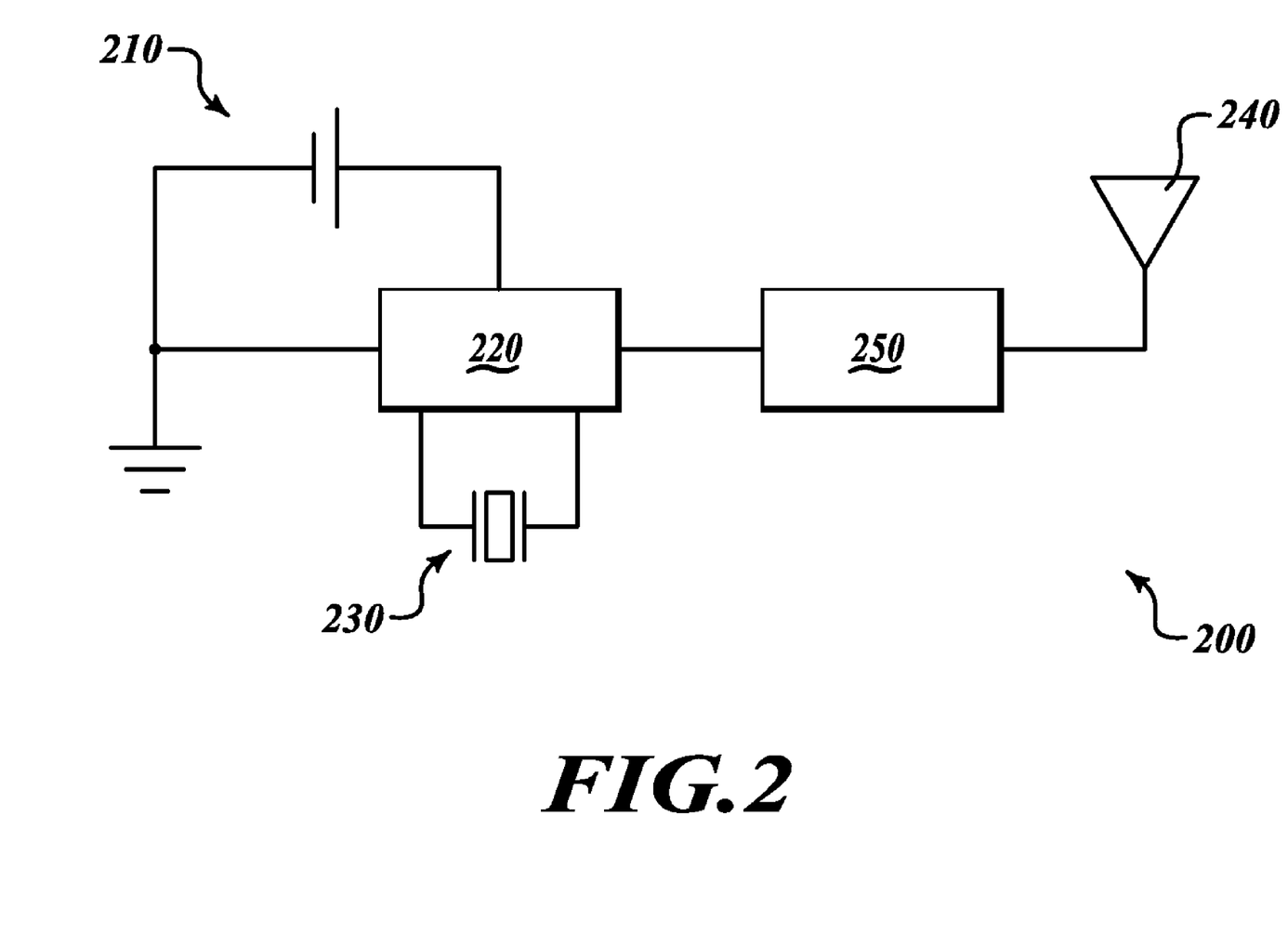
FIG. 2 is a schematic diagram of a micro-beacon according to an embodiment of the invention.

FIG. 2 is a schematic diagram of a micro-beacon 200 attachable to one or more of the vehicles 110, 120 as described above. The micro-beacon 200 may be very small, lightweight and self sufficient, to allow unobtrusive installation on even very small vehicles 110, 120. In an embodiment, total beacon 200 size, including antennas, battery and electronics can be fabricated and packaged in an envelope of approximately 1 inch×1 inch×¼ inch thick, with a total unit weight of about 10 grams.

Attachment to the vehicles 110, 120 can be accomplished using a peel-off self adhesive, without need for power or data interfaces to the vehicles 110, 120. This approach makes instrumentation of numerous small vehicles 110, 120 extremely quick and simple. The small size and light weight allows the micro beacon 200 to be mounted on the vehicles 110, 120 where convenient, such as on a chassis of the vehicle, without significantly affecting the dynamics or stability of the vehicles 110, 120. Larger vehicles 110, 120 can be instrumented with several micro-beacons 200, to improve tracking probability and performance.

In an embodiment, power for the micro-beacon 200 may be supplied from a battery 210. The battery 210 may be a single $LiMgO_2$ coin cell, such as the commonly available CR2032 watch battery. Beacon 200 operating time using this battery 210 may be dependent upon transmit period, data rate and beacon broadcast duration, and may be approximately one week for typical operation at a 1-second transmit period. If longer durations are required, other embodiments are available to accommodate this need. A larger battery, such as the CR2477, can be used to increase total energy available, at the expense of approximately 5 g of weight. Alternatively, the period between beacon broadcasts can be increased to linearly increase the operating time, at an expense of positioning accuracy.

The micro-beacon further includes a transmitter 220 and associated crystal 230. The transmitter operates in conjunction with an antenna 240. In an embodiment, transmitter 220 supports transmit power levels up to +10 dBm (10 mW) over a frequency range between 300 MHz and 464 MHz. Supported modulation formats include 2-level frequency shift keying (2FSK), Gaussian frequency shift keying (GFSK), minimum shift keying (MSK), or amplitude shift keying (ASK), at selectable data rates between 1.2 kbps and 500 kbps. In addition, the transmitter 220 can operate on up to 127 channels of selectable bandwidth, including support for frequency hopping spread spectrum (FHSS) transmission at a hopping rate of up to 12,500 hops/sec.

The beacon 200, in an embodiment, also includes a processor 250, such as an embedded 8-bit microcontroller, that is capable of hosting and implementing optionally advantageous networking protocols. This processor 250 can be used to implement a simple linear feedback shift register (LFSR), capable of generating pseudo-noise (PN) sequences, such as Gold codes. This PN sequence can act as the beacon's 200 unique identification and allow a ground station 130 to separate multiple simultaneous beacon signals. At periodic intervals, the micro-beacon 200 can wake up from a low-power sleep state, transmit its unique PN code, and then return to the low-power sleep state.

Pseudo-noise Gold codes may be preferable due to their property of having very low cross-correlation coefficients between different codes, as well as having excellent autocorrelation characteristics, to allow signal separation. The longer the code, the better the ability to identify and separate signals, and the greater the number of simultaneous signals that can be separated. However, longer codes consume more power or require higher data transmission rates, which can negatively impact the beacon lifetime or operational range. As such, other approaches may be utilized to facilitate combinations of code length, transmit frequency and power consumption to match user needs. In an embodiment, an 8-bit LFSR may be utilized, resulting in 255-bit code length, transmitted at 9600 bps.

In an embodiment, a more full-featured remote sensing radio solution that operates in the 300-400 MHz band may be employed. This solution uses the same transmitter 220 integrated circuit, but implements a much more full featured communications solution, including higher transmit power (250 mW), advanced mesh networking for 2 way data communication, and extensive data interface capabilities within a 2"×3" form factor.

In an embodiment, a large portion of the system's complexity and processing is contained in the ground tracking stations 130. Each ground station 130 may have at least five functions: (1) capture micro-beacon 200 signals, (2) separate multiple beacon signals from each other, (3) compute the lines of bearing associated with transmitting beacons, (4) collect measured lines of bearing from other ground tracking stations 130, and (5) perform triangulation or multilateration to compute position for each received micro-beacon 200.

In order to maximize the operation range of an embodiment of the system, a high-gain antenna may be desired. Simultaneously, it is desirable to have each ground station 130 be able to monitor a wide angle in space. One solution is to use a phased-array antenna, which receives multiple high-gain beams. Digital beam forming allows multiple high-gain beams to be spread over a wide area, but the angular resolution of the received signal may be limited by the beamwidth of the received beams. For reasonably sized antennas, (e.g., on the order of 2 meters on edge), the beamwidth of each beam at 433 MHz may be approximately 17 degrees. Smaller antennas may have a larger beamwidth. Thus, angular resolution would only be on the order of several degrees, at best.

Figure 3A:
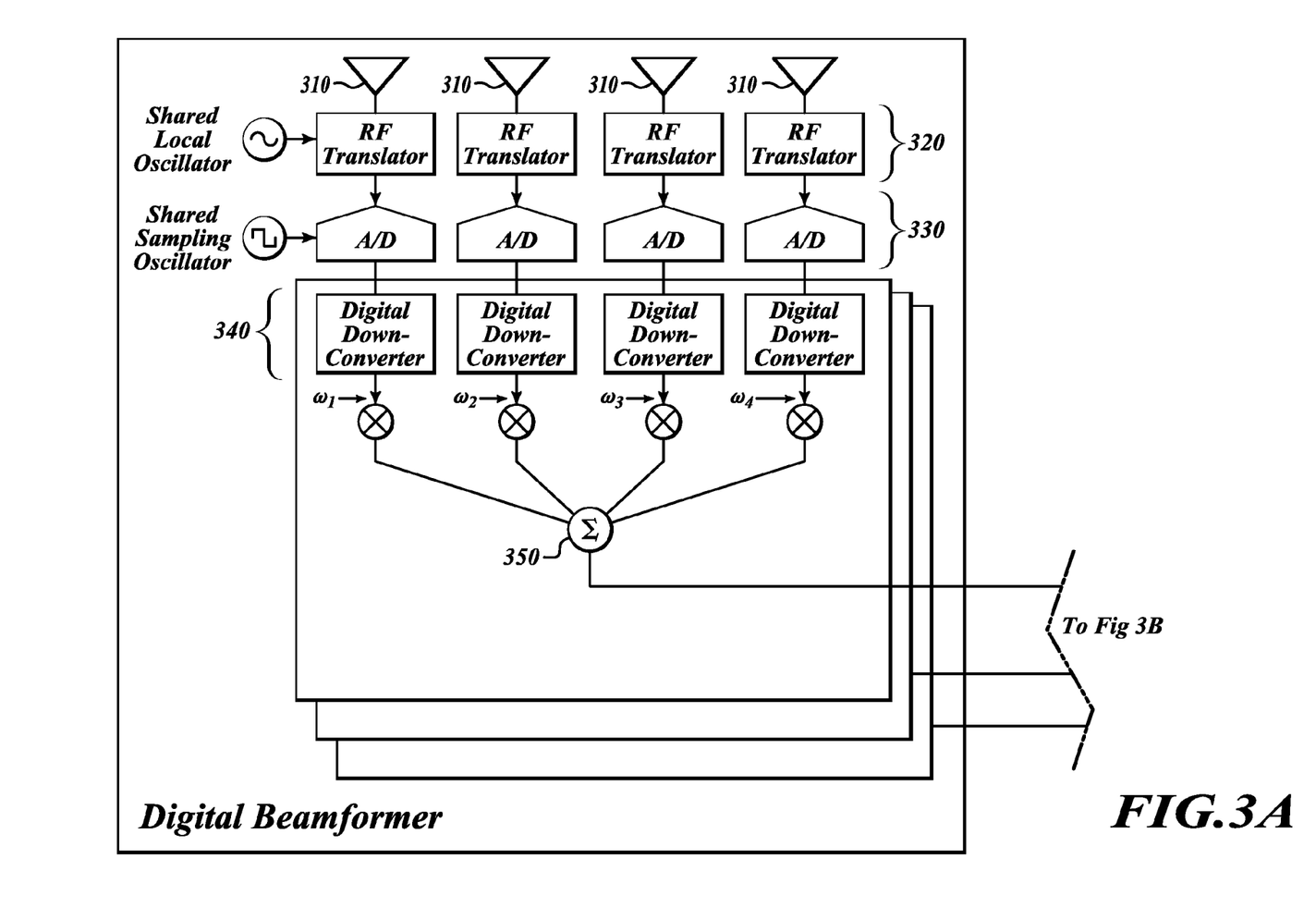
FIGS. 3A-3B illustrate a functional block diagram of the processing performed in each ground station utilizing a digital-beam-formed phased-array approach according to an embodiment of the invention.
Figure 3B:
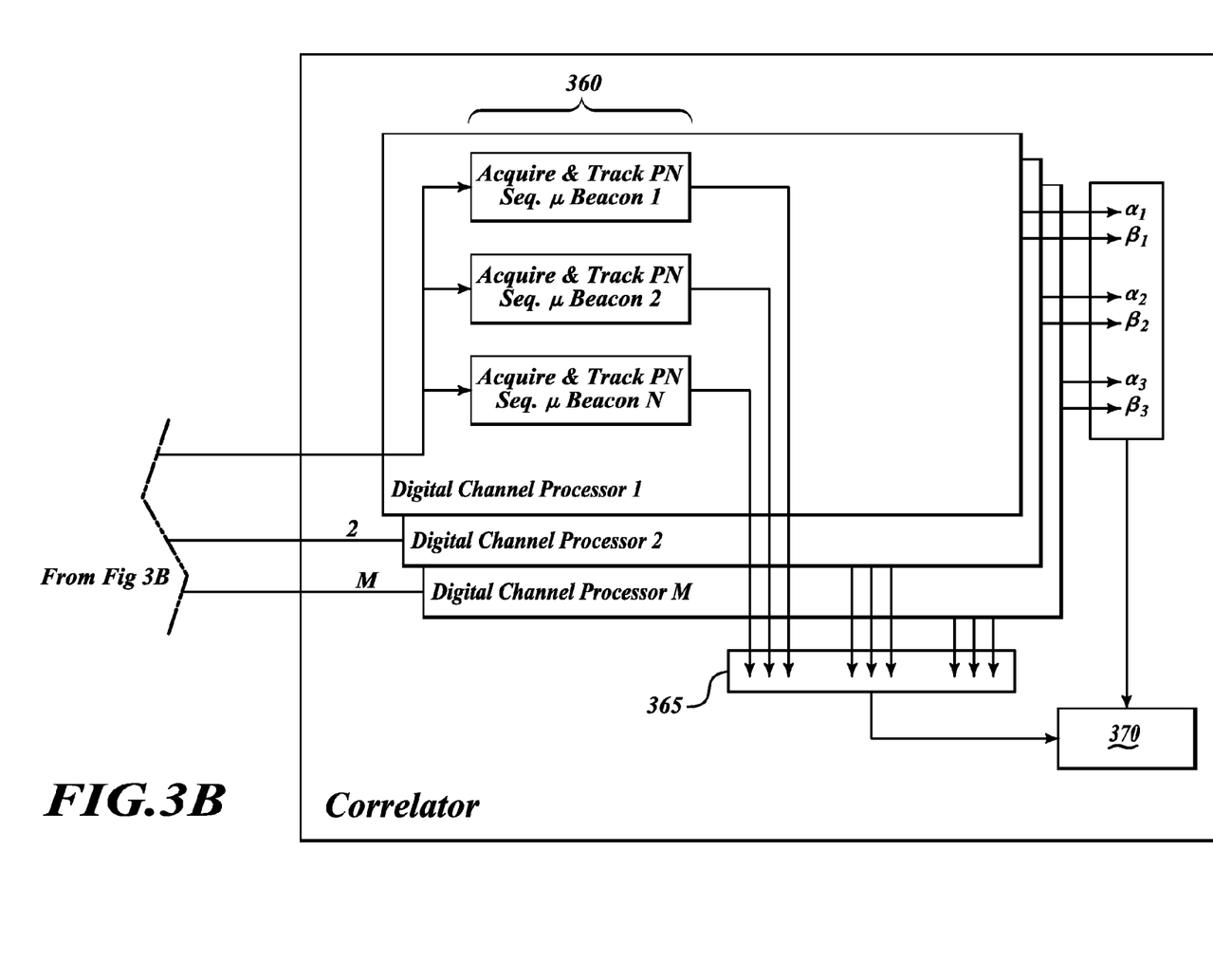

FIGS. 3A-3B illustrate a functional block diagram of the processing performed in each ground station 130 utilizing a digital-beam-formed phased-array approach. As seen in FIGS. 3A-3B, each of the elements 310 in the ground tracking station 130 antenna array may be translated by a translator array 320, digitized by an A/D converter array 330, and down converted by a digital down-converter array 340. The digital signals from each element 310 are combined in a digital beamformer 350 to generate M number of beams, each pointing in a different direction. The digital signal for each of the M beams is further downconverted to baseband and sent to N parallel correlators 360, where N is the number of possible PN codes that need to be identified (e.g., 257 correlators for a 255 bit Gold code). Each correlator 360 includes a code acquisition and tracking loop to identify and synchronize received PN code sequences. The azimuth α and elevation angle β associated with each tracked beacon 200, along with the ID 365 of the beacon, is output to a processing device 370 to allow triangulation or multilateration with direction cosines from other ground tracking stations 130. The processing device 370 is in signal communication, or may otherwise be unitary, with one or more of the tracking stations 130.

Alternatively, a desirable level of angular resolution can be achieved by using unitary antennas that are spaced over a longer baseline, and performing time-difference-of-arrival computations on the received signals, to calculate angle of arrival. However, because unitary antennas have lower gain than arrays, operational range may be limited and the number of ground tracking stations 130 required may increase. Yagi, helical or panel type antennas can achieve 12-15 dBi gain, resulting in 30-50% of the operational range of a high gain array for the same beacon transmit power. In addition, these high gain antennas have a smaller beamwidth than is achievable using the digital beamformed array, but this can be remedied by employing several antennas, but not a phased array, pointing in different directions to provide wider real beam coverage.

Figure 4A:
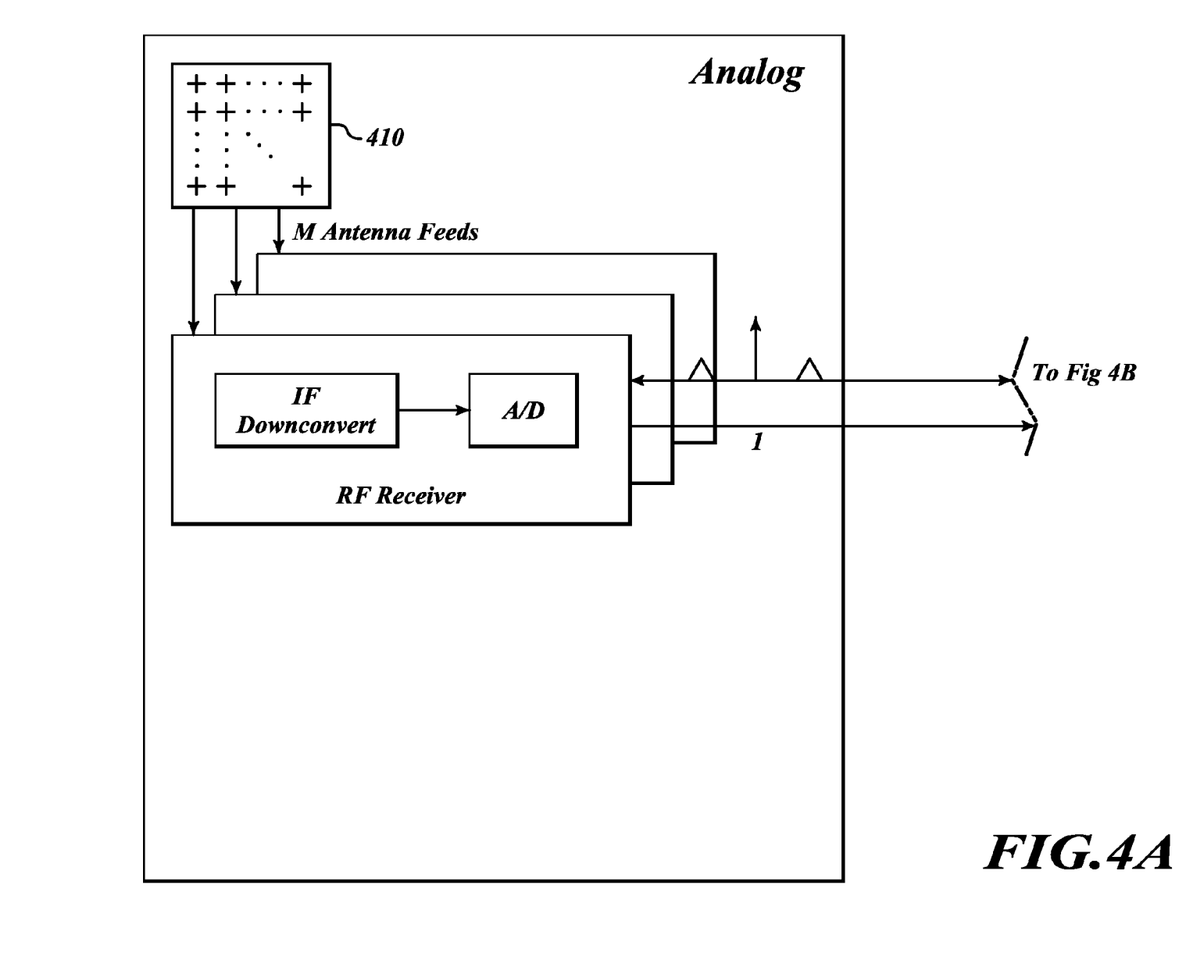
FIGS. 4A-4B illustrate a functional block diagram of the processing performed in each ground station utilizing an array of long baseline antennas according to an embodiment of the invention.
Figure 4B:
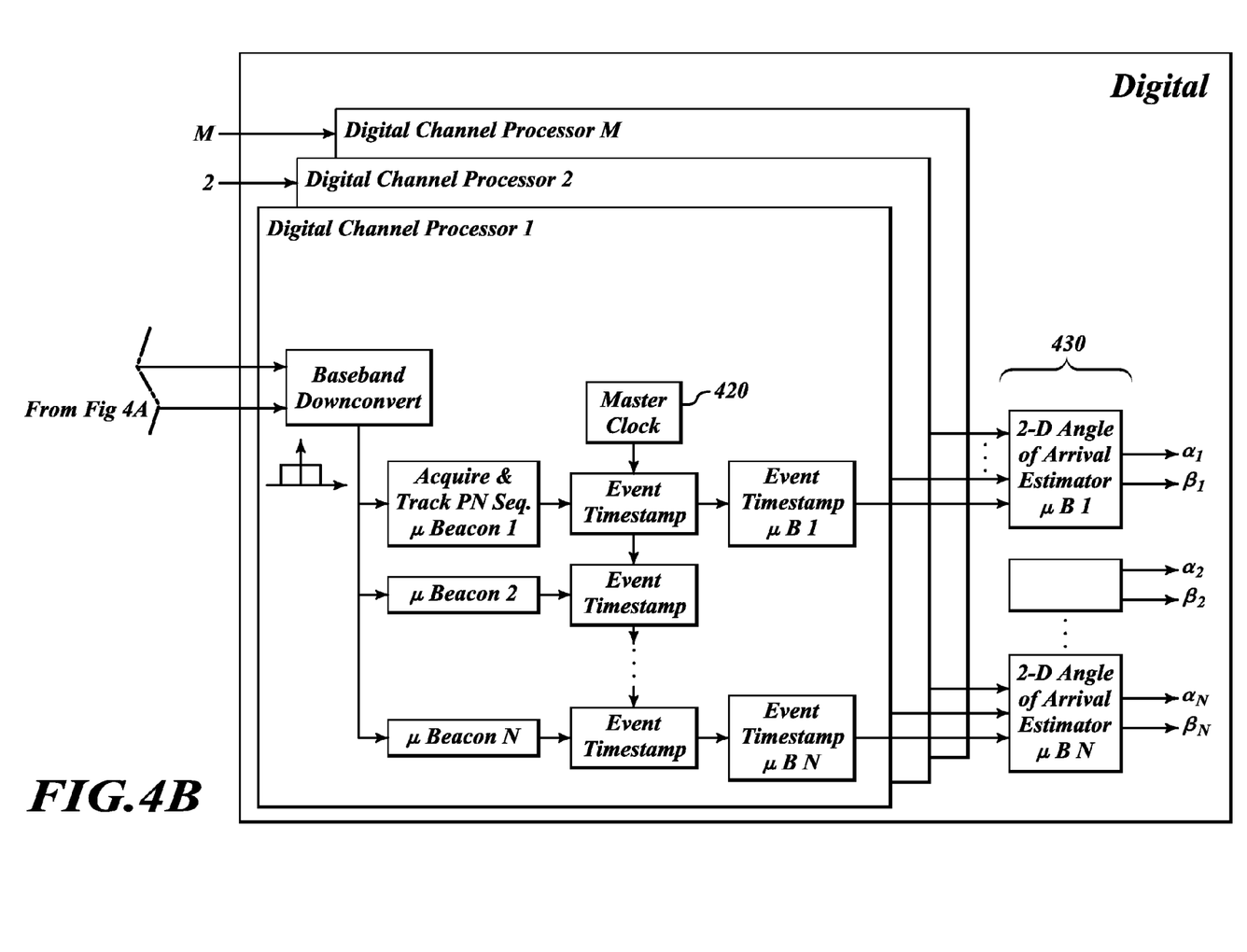

Processing for an array of long baseline antennas, according to an embodiment, is shown in FIGS. 4A-4B, and is similar in many ways to the approach described with reference to FIGS. 3A-3B. In this case, the received signals from each of M physical antennas 410 are, in a manner similar to that described with reference to FIGS. 3A-3B, downconverted, digitized and sent to a parallel correlator structure, similar in functionality to correlators 360 also described with reference to FIGS. 3A-3B. However, when signals are identified, they are time tagged, using a high accuracy clock 420, derived from GPS timing, and sent to angle-of-arrival estimators 430, along with time tagged correlations from other antenna elements. Using arrival time differences and knowledge of the antenna element spacing and orientation, the angle of arrival can be computed and decomposed into azimuth and elevation angles of arrival, to estimate the relative direction of the micro-beacon with respect to the antenna boresight.

In either of the arrangements described with reference to FIGS. 3A-3B and 4A-4B, it is optionally advantageous to know the relative antenna locations and boresight directions. High accuracy position determination for the tracking stations can be accomplished using traditional surveying techniques, or differential carrier phase GPS measurements. Ground station antenna boresighting can be accomplished using traditional approaches, such as using theodolite or laser surveying equipment, or it can be done in an ad-hoc fashion for cases where antennas are within line of sight of each other, by attaching a micro-beacon to each ground station and computing the relative boresight directions between each ground station antenna pair.

Field programmable gate arrays (FPGAs) are optionally advantageous to performing highly parallel computations, such as required for code correlation. Alternative implementations can also be used that require less parallelism, such as performing serial search acquisition instead of parallel acquisition, or conducting acquisition in the frequency domain instead of in the time domain. The low data rate of the MTAS beacon provides ample opportunity to exploit such an approach.

For the objective micro-beacon tracking of autonomous systems, the expected operational range can be estimated using the Friis Range Equation $$\frac{P_R}{P_T} = \frac{G_T G_R \lambda^2}{(4\pi R)^2 L}$$

where $P_T$, $P_R$ $G_T$, and $G_R$ are the transmitted and received power and antenna gains, respectively, λ is the wavelength, R is the distance between transmitter and receiver and L represents system losses.

Knowing values for antenna gains, micro-beacon transmit power and receiver sensitivity, the maximum expected range for the transmission link can be estimated.

This range estimate includes a 3 dB polarization loss, antenna shaping losses and a fade margin of approximately 18 dB, which provides a 99% link availability in line of sight conditions, as well as providing significant robustness to accommodate signal attenuation and multipath from terrain, foliage, obstacles and canyon effects.

For the phased-array ground station configuration, a 2 m×2 m phased array aperture may be used. A phased-array antenna of this size at 433 MHz, may require 34 elements, resulting in a relatively inexpensive phased array antenna. For the wide baseline unitary antennas, a 10 turn helical antenna may be used for computation. Other antenna types, such as Yagi or panel antennas can be used and would provide similar performance.

As discussed above, the beacon design can be adjusted to meet specific needs. Using a slightly larger battery can increase operational life, or power a higher power beacon. Increasing beacon output power to 100 mW (+20 dBm), results in approximately three times the operational range of 10 dBm. Up to 50 km can be achieved with a 250 mW transmitter and the phased array antenna.

The operating time for a micro-beacon is related to a number of controllable parameters, including battery sizing, transmit interval, PN code length and transmit data rate. To attain maximum range, it is desirable to minimize the transmit data rate, in order to reap benefits of higher receive sensitivity. In order to maximize system capacity, a longer code is desired to maximize processing gain and overcome the effect of increased noise floor. However, in order to achieve maximum battery life, it may be desired to operate for as short a period as possible, thus a higher data rate and shorter PN code length would be desirable.

In an embodiment, a 255 bit PN code length may be used, operating at 9600 bps. Assuming 1 second transmit intervals, the maximum duration for the micro beacon is expected to be approximately 167 hours, or 7 days of continuous operation using a CR2032 battery. For long duration requirements, the transmit period can be lengthened to increase beacon lifetime proportionally. Alternatively, when the platform can support a slightly larger and heavier beacon, a larger coin cell battery (such as the CR2477) can be used to increase operational time to greater than 1 month of full-time operation at a 1 second transmit interval. The impact of using this larger battery would add approximately 5 g to the weight and 5 mm to the beacon thickness. This same approach can be used to develop a higher power beacon that extends the operational range.

PN coding can be used to allow separation between multiple simultaneous or overlapping signals. However, although judicious selection of PN sequences minimizes cross correlation, multiple overlapping signals do increase the effective noise floor, thereby reducing the received signal to noise ratio (SNR). Correlation can identify a particular sequence from several, but a minimum SNR may be required. Longer code lengths provide higher processing gain, thus minimizing impact of the increased noise floor. However, as alluded to in the previous section, increasing code length can also reduce operating time and maximum reception range.

This problem is exacerbated by the so called near-far problem, where two transmitters transmit simultaneously at equal power, but one transmitter is much closer to the receiver than the other. The receiver will receive more power from the nearer transmitter, making the farther transmitter more difficult, if not impossible, to "understand." Since one transmission is the other's noise, the signal-to-noise ratio (SNR) for the farther transmitter is much lower. If the nearer transmitter transmits a signal that is received magnitudes of order greater the farther transmitter, then the SNR for the farther transmitter may be below detection threshold. This effectively jams the communication channel. To solve this problem, transmitter output power can be dynamically adjusted. Thus, the closer transmitters use less power so that the SNR for all transmitters at the receiver is roughly the same.

In general, the capacity of a code division cell is given by the relationship:

$$N = 1 + \frac{1}{\alpha}\left[\frac{W/R}{\frac{E_b}{N_0}}\right]$$

where $\alpha$ is the activity factor, (W/R) is the processing gain and $E_b/N_0$ is the required bit energy to noise ratio to achieve a desired bit error rate performance.

For a 255 bit PN code, transmitted at 9600 bps, each transmitter will be broadcasting approximately 27 ms per second, thus $\alpha=0.027$, when repeated at 1 second intervals. Assuming a required Eb/N0 of 12 dB, to achieve a bit error rate of $10^{-4}$, and a 1 MHz frequency hopping bandwidth, the total number of simultaneous users can be calculated to be approximately 244 micro-beacons.

Embodiments of the invention provide several design features that can be used to provide simple, cost effective upgrades. In addition to simply transmitting vehicle identification information, the micro translators can also be designed to report other important system parameters, as reported by the vehicle itself. For example, vehicle altitude, battery life, temperature, or perceived truth data can be provided to the micro translator for transmission to the tracking station. For small vehicles without inherent telemetry capabilities, this can provide a simple, cost effective and effective approach to retrofitting basic telemetry to even the smallest autonomous vehicles.

For vehicles that maintain world models, this concept can be expanded even further If available on the vehicle, sensed world model data can also be provided to the micro-translators, in the form of bandwidth efficient means, such as Source for Environment Data Representation and Interchange (SEDRIS). The sensed environment can be fed directly to a visualization engine to provide near real-time display of workings of the vehicle's perception. This capability enables investigation of autonomous system behavior in the cognitive and social domains, in addition to the physical domain capabilities of the core system.

The ability to provide an off-board telemetry downlink is something that current range tracking systems cannot provide. Although possessing greater capabilities, current telemetry systems are far too large and require far too much power to work with very small autonomous vehicles.

Embodiments of the invention can also be expanded to include pre and post mission data processing. To ensure maximum visibility of beacons in a particular environment, a mission planning tool can be utilized to identify the quantity and locations of ground stations necessary to achieve a desired tracking probability throughout the test area.

In addition, data can be provided to a real-time or post-mission visualization engine, that allow users to visualize the operation and cooperative nature of multiple UAS, within context of the actual operational environment. Use of synthetic vision can provide a "god's eye" or "driver's eye" view of the operational environment and interactions between vehicles within the group.

If link performance proves a significant problem for ground vehicles, alternatives exist to mitigate this effect. In addition to increasing transmit power, potential mitigation approaches include using telescoping or erectable towers for ground station antenna placement, to increase the angle between transmitter and receiver. Alternatively, the tracking station can be designed to operate in an airborne environment, such as from a tethered aerostat. This approach allows significantly increased RF performance for both air and ground vehicle tracking.

Beacon transmitters according to embodiments of the invention are capable of encryption, using 128 bit advanced encryption standard (AES-128), although use of such encryption may increase the amount of data that is transmitted, thus reducing the operational lifetime and number of MTAS micro-beacons that can be supported.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which exclusive property or privilege is claimed are defined as follows:

1. A system, comprising:
a first beacon having a first transmitter and a second beacon having a second transmitter, the first and second beacons configured to be attached to first and second vehicles, respectively, the first and second transmitters each further configured to transmit successive signals at predetermined time intervals;
a plurality of portable tracking stations, each tracking station positioned at a location different from that of each other tracking station, each tracking station configured to receive the signals transmitted by at least one of the first and second transmitters, each tracking station further configured to distinguish signals transmitted by the first transmitter from signals transmitted by the second transmitter, each of the tracking stations further configured to determine respective angles of arrival associated with the signals received from at least one of the first and second transmitters, each of the tracking stations further configured to be in signal communication with at least one other of the tracking stations; and
at least one portable processing device in signal communication with at least one of the tracking stations, the processing device configured to determine a location of the first vehicle relative to a location of the second vehicle based on the respective determined angles of arrival;

wherein the first and second beacons are configured to communicate with the plurality of portable tracking stations in a single communication direction.

2. The system according to claim 1 wherein at least one of the first and second vehicles is at least one of a ground vehicle and an unmanned vehicle.

3. The system according to claim 1 wherein at least one of the first and second vehicles is autonomously controlled.

4. The system according to claim 1 wherein the first and second transmitters are powered independently of the first and second vehicles.

5. The system according to claim 1 wherein the first and second transmitters are further configured to generate respective pseudo-noise sequences to enable the tracking stations to distinguish the signals.

6. The system according to claim 1 wherein at least one of the tracking stations comprises a phased-array antenna.

7. The system according to claim 1 wherein the position information comprises azimuth and elevation angle.

8. The system according to claim 1 wherein the processing device determines the relative positions of the first and second vehicle using a triangulation method.

9. The system according to claim 1 wherein the at least one processing device is unitary with at least one tracking station.

10. A method, comprising:

attaching a first beacon having a first transmitter to a first vehicle, the first transmitter configured to transmit successive signals at predetermined time intervals;

positioning each of a plurality of portable tracking stations at a location different from that of each other tracking station of the plurality, each tracking station configured to receive the signals transmitted by the first transmitter, each of the tracking stations further configured to determine angles of arrival associated with the transmitted signals from the first transmitter, each of the tracking stations further configured to be in signal communication with at least one other of the tracking stations; and determining a location of the first vehicle based on the determined angles of arrival;

wherein the first beacon is configured to communicate with the plurality of portable tracking stations in a single communication direction.

11. The method according to claim 10, further comprising:

attaching a second transmitter to a second vehicle, the second transmitter configured to transmit successive signals at predetermined time intervals, wherein each tracking station is configured to receive the signals transmitted by at least one of the first and second transmitters, each tracking station further configured to distinguish signals transmitted by the first transmitter from signals transmitted by the second transmitter, each of the tracking stations further configured to determine from the transmitted signals respective position information for at least one of the first and second transmitters; and determining from the position information a location of the first vehicle relative to a location of the second vehicle.

12. The method according to claim 11 wherein the first and second transmitters are further configured to generate respective pseudo-noise sequences to enable the tracking stations to distinguish the signals.

13. The method according to claim 10 wherein the first vehicle is at least one of a ground vehicle and an unmanned vehicle.

14. The method according to claim 10 wherein the first vehicle is autonomously controlled.

15. The method according to claim 10 wherein the first transmitter is powered independently of the first vehicle.

16. The method according to claim 10 wherein at least one of the tracking stations comprises a phased-array antenna.

17. The method according to claim 10 wherein the position information comprises azimuth and elevation angle.

18. The method according to claim 10 wherein determining the position of the first vehicle comprises using a triangulation method.

* * * * *